United States Patent [19]
Harvey

[11] Patent Number: 6,138,216
[45] Date of Patent: Oct. 24, 2000

[54] MICROPROCESSOR CACHE CONSISTENCY

[75] Inventor: Ian Nigel Harvey, Cambridge, United Kingdom

[73] Assignee: nCipher Corporation Limited, United Kingdom

[21] Appl. No.: 09/010,256

[22] Filed: Jan. 21, 1998

[30] Foreign Application Priority Data

Jul. 15, 1997 [GB] United Kingdom .................... 9714757

[51] Int. Cl.[7] .......................... G06F 12/08; G06F 15/167
[52] U.S. Cl. ............................ 711/139; 711/138; 711/144
[58] Field of Search .................... 711/139, 138, 711/144, 145, 153; 707/205

[56] References Cited

U.S. PATENT DOCUMENTS

| | | | |
|---|---|---|---|
| 4,885,680 | 12/1989 | Anthony et al. ........................ | 711/144 |
| 5,075,848 | 12/1991 | Lai et al. ................................. | 711/156 |
| 5,091,846 | 2/1992 | Sachs et al. ............................ | 711/130 |
| 5,321,834 | 6/1994 | Weiser et al. ........................... | 711/170 |
| 5,897,660 | 4/1999 | Reinders et al. ........................ | 711/170 |

OTHER PUBLICATIONS

Stenstrom P., "A Survey of Cache Coherence Schemes for Multiprocessors", Computer, vol. 23, No. 6, Jun. 1, 1990, pp. 12–24.

Brorsson M et al, "Characterising and Modelling Shared Memory Accesses in Multiprocessor Programs" Parallel Computing, vol. 22, No. 6, Sep. 1996, pp. 869–893.

*Primary Examiner*—Do Hyun Yoo
*Assistant Examiner*—Yamir Encarnacion
*Attorney, Agent, or Firm*—Young & Basile, P.C.

[57] ABSTRACT

A method is described of managing memory in a microprocessor system comprising two or more processors (40, 42). Each processor (40, 42) has a cache memory (44, 46) and the system has a system memory (48) divided into pages subdivided into blocks. The method is concerned with managing the system memory (48) identifying areas thereof as being "cacheable", "non-cacheable" or "free". Safeguards are provided to ensure that blocks of system memory (48) cannot be cached by two different processors (40, 42) simultaneously.

12 Claims, 3 Drawing Sheets

MICROPROCESSOR CACHE CONSISTENCY

INTRODUCTION

The present invention is concerned with cache consistency, and is particularly concerned with cache consistency involving a plurality of processors sharing a common memory space.

BACKGROUND OF THE INVENTION

In a multiple processor system, there would normally be provided a system memory available to any of the processors of the system, and cache memory associated with each individual processor. The cache memory associated with any particular processor is only accessible to that processor.

In memory architecture, a cache memory is commonly used to provide enhanced memory access speed. A cache memory is a small, fast memory which is used for keeping frequently used data. Each cache memory is relatively much smaller than the system memory.

Generally, it is much quicker to read from and/or write to cache memory than to system memory, and so the provision of cache memory enhances the performance of a microprocessor system.

A simple example of the use of a cache memory in a single processor system is illustrated in FIG. 1 of the drawings appended hereto.

The system so illustrated comprises a CPU 10, a system memory 12 and a cache memory 14 interposed between the CPU 10 and the system memory 12.

The cache memory 14 is faster and smaller than the system memory 12.

When the CPU 10 reads data A from the system memory 12, a copy of the data A is retained in the cache memory 14. If the CPU reads data A again soon afterwards, the cache memory 14 is accessed for the data, and not system memory 12. The cache memory 14 is quicker than system memory, and so performance is increased.

Since the cache memory 14 is smaller than the system memory 12, it cannot keep copies of all of the data the CPU may want to access. Over time, the cache memory will become full. To overcome that, old cache memory entries are periodically removed ("flushed") to make space for new entries. This does not result in the loss of data because the original data is still in system memory 12 and can be re-read when needed.

It might be necessary for a CPU 10 to modify data and to return the modified data to memory. FIG. 2 shows the structure of FIG. 1 in a different state to reflect that situation.

If the CPU modifies data A and replaces it with data B, the modified data B is stored in the cache memory 14. It is not immediately written to system memory 12. Since the cache memory is faster, this improves write speed. The alternative situation, whereby data is written to system memory immediately, and which is known as a "write-through" cache memory, is simpler but slower.

If the CPU wants to read the data after modification, it is important that the CPU receives the modified data B held in the cache memory 14 rather than the unmodified data A held in the system memory 12.

This is achieved easily since the CPU always accesses the cache memory 14 in the first instance. However, when data is flushed from the cache memory, it is important that the modified data B is not lost. Accordingly, when flushing takes place, modified data B is written back to system memory 12.

As illustrated in FIG. 3, the flushing process is triggered by the CPU wanting to retrieve a new piece of data X. The cache memory determines that the new data X must be placed in a position already occupied by modified data B. The cache memory has previously noted that the data B is modified from original data A.

Therefore, data B must be written to system memory 12. Afterwards, data X is read from system memory 12, and is written to the position in the cache memory 14 occupied by data B.

Finally, the CPU reads data X from the cache memory 14.

The write-back cache memory described above is highly appropriate for use with a single processor. However, in order to obtain more effective processing capacity, a plurality of processors can be used in a system. In that case, the processors can share a system memory.

An example of a multi-processor system is shown in FIG. 4, where first and second CPU's 20, 22 are provided. Each CPU 20, 22 has a respective one of first and second cache memories 24, 26 associated with it, and the system has a system memory 28 shared between the CPU's 20, 22.

In the case illustrated, the two CPU's 20, 22 have both recently read data A from system memory 28. Hence, their cache memories 24, 26 contain data A. If the second CPU 22 replaces data A by writing modified data B to that position in the second cache memory 26, then the second cache memory will retain the new data B but the first cache memory 24 and the system memory 28 will have the original data A.

The situation described above causes problems since it constitutes an inconsistency in the cache memories 24, 26. The situation could deteriorate even further if the first CPU 20 modifies data A to data C. In that case, there would be three different versions of the data in the system.

Several solutions to the above problems have previously been presented.

In one solution, the cache memory design is modified. In the modified design, the cache memories are governed by a hardware protocol to communicate with each other. In that way, if the second cache memory 26 reads data of which the first cache memory 24 has a copy, then the first cache memory 24 takes note of this and informs the second cache memory 26. Both cache memories 24, 26 now recognise the data as "shared".

When either of the CPU's 20, 22 modifies data which is marked as shared, the cache memories 24, 26 have to communicate with each other in order to pass the modified data to each other.

The above arrangement is not always suitable. Most proprietary CPU chips have cache memory logic (which implements the hardware protocol governing operation of the cache memory) on the same chip as the processor itself. If the cache memory logic implements the sharing protocol described above, then the chip is suitable to be used in the above manner to reduce the effects of cache inconsistency. However, if the sharing protocol is not implemented then the chip cannot be used in the above manner. A chip cannot be modified to implement a protocol not originally provided for.

Another system for solving the above problems is illustrated in FIG. 5. In that system, as before, first and second CPU's 20, 22 are provided. Each CPU 20,22 has a respective one of first and second cache memories 24, 26 associated with it, and the system has a system memory 28 shared between the CPU's 20, 22.

The system memory 28 is divided up into fixed portions. Each CPU 20,22 is assigned a fixed portion of private memory 30, 32, with which it may use its cache memory 24, 26. There is also a block of shared memory 34 which is used for communication between the CPU's. The CPU's 20,22 are prevented from using their cache memories 24,26 (almost all have software or hardware means to do that) when they use the shared memory 34, so that the cache inconsistency problems do not arise.

However, the system described above has various problems associated with it.

The division of the available memory between the CPU's is established during system design. The amount of private memory to be allocated to each CPU, and the amount of shared memory to be allocated for communication, needs to be predicted by calculation or estimate.

It could be found that a system designed in that way runs out of memory if the first CPU 20 is required to do a job which needs more memory than is allocated to that CPU. Even if the second CPU 24 is inactive, its private memory 32 is unavailable for use by the first CPU 20.

If a system is provided with more than two CPU's, the problem is compounded, as the share of total system memory available for use by each CPU is reduced. For example, in a system having eight processors and a 1 Mbyte system memory, each of the processors will be limited to jobs requiring no more than 128 Kbyte of private memory.

Moreover, since the amount of shared memory must be fixed beforehand, the amount of communication between processors is limited by the predetermined size of the shared memory. A compromise must be reached between all of the processors being able to communicate at the same time and retaining sufficient private memory for processing.

For that reason, existing solutions have been restricted to systems having a small number of CPU's with a large amount of memory, or systems which execute a very specific range of operations in which case the memory size allocation can be predicted with a reasonable degree of certainty.

An alternative arrangement allows for the dynamic allocation of memory between the various processors of a multi-processor system.

FIG. 6 illustrates a multi-processor system, where first and second CPU's 40, 42 are provided. Each CPU 40, 42 has a respective one of first and second cache memories 44, 46 associated with it, and the system has a system memory 48 shared between the CPU's 40, 42.

Each CPU 40, 42 has a memory management unit which is operative with associated software to administer the use made by the CPU 40, 42 of the system memory 48 and the cache memory 44, 46.

The system memory 48 is apportioned into a plurality of pages. Each page is itself sub-divided into a plurality of blocks. Each page is flagged with a status, namely "cacheable", "non-cacheable" or "free".

Cacheable memory is available to be allocated for the use of a specific CPU 40, 42 and can be stored in that CPU's cache memory.

Non-cacheable memory is available to be read directly by any of the CPU's and cannot be copied to a cache memory.

Free memory is yet to be allocated as either cacheable or non-cacheable, a situation which allows the dynamic allocation of system memory as memory allocation requirements become known during execution of software in the system.

The system memory 48 contains a page table, which is stored in one or more blocks of a page flagged as non-cacheable. The page table has stored therein the status of each page of the system memory 48. If the page table is too large to fit on one page of system memory, then it is stored over more than one page, all of which are flagged as non-cacheable.

Each cache memory 44, 46 has a translation lookaside buffer (TLB) which is operative to contain the same information as the page table of the system memory 48, relating to the status of pages of the system memory 46, but only in respect of pages of the system memory which have been accessed most recently by that cache memory 44, 46.

Data which is "local" or "private" to a particular CPU 40, 42 can be stored in the cache memory 44, 46 corresponding to that CPU 40, 42. In that way, access to that data is faster than if the CPU had to access the system memory 48.

Data which is "public", "global" or "shared" between more than one CPU 40, 42 cannot be cached since cached data is only accessible to one CPU. Therefore, the data must be read from and written to non-cacheable pages of system memory 48 directly.

System memory 48 is allocated dynamically to each CPU as it is required. If one of the CPU's requires a portion of system memory 48, the CPU will look in the page table for a page which is flagged as cacheable or non-cacheable. The decision as to whether cacheable or non-cacheable memory is required is dependent on whether the data to be used in conjunction with the allocated memory space is local or global.

If a page of appropriate status is available, which has sufficient unallocated blocks therein to comply with the request for memory, those unallocated blocks will be allocated by the memory management unit and associated software, to the use of the CPU 40, 42 making the request.

If there are insufficient unallocated blocks in any one appropriately flagged page for the requested memory space to be allocated, then the requested memory space can be allocated from a concatenation of blocks from different pages each having the appropriate status.

If there are not sufficient unallocated blocks in appropriately flagged pages of the system memory 48 for the request for memory space to be fulfilled, then the memory management unit and associated software will allocate system memory blocks that are on a page flagged as "free". Then, the page table will be updated to change the status of the page to "cacheable" or "non-cacheable" as the case may be.

The device as described above is more versatile and flexible than previous devices as exemplified by the devices described in the introduction. As a result, more effective memory management is available with limited cost on memory space.

OBJECT OF THE INVENTION

It is an object of the present invention to present a system which has improved performance relative the systems described above.

STATEMENT OF INVENTION

According to one aspect of the invention, there is provided a method of managing memory in a system comprising two or more processors each having a cache memory and the system having a system memory, the system memory being divided into pages sub-divided into blocks, the method comprising the steps of:

flagging each of the pages of system memory with a status, the status being one of "cacheable", "non-cacheable" and "free";

retaining a page record as to the status of each page;

if a block of memory is required for storage of data local to a specific processor then allocating a block of a page having "cacheable" status to be accessed by said processor, but if no block of a page having "cacheable" status is available then selecting a page having "free" status and changing the status of said page to "cacheable";

if a block of memory is required for storage of data to be accessed by more than one processor then allocating a block of a page having "non-cacheable" status to be accessed by any processor, but if no block of a page having "non-cacheable" status is available then selecting a page having "free" status and changing the status of said page to "non-cacheable";

retaining an allocation record as to which blocks of a page have been allocated;

if an allocated block is no longer required then amending the allocation record to discard the allocation of the block; and if no blocks on a page of memory having "cacheable" or "non-cacheable" status are allocated then changing the status of said page to "free".

The above method is advantageous in that provision is made for the status of a page to be changed from "free" to "cacheable" or vice versa, or from "free" to "non-cacheable" or vice versa. However, no provision is made for the status of a page to be changed directly from "cacheable" to "non-cacheable" or vice versa. The steps of the method preclude such a change in status. Accordingly, the method inhibits errors from occurring which are associated with local and global data colliding or becoming confused.

Preferably, the step of discarding the allocation of a block allocated from a page having "cacheable" status comprises the step of discarding the data of the block.

In that way, the speed of the discarding step is enhanced, since there is no need to write back data to main memory which is merely local data held in cache memory for the access of one processor. The method allows a proper distinction to be made between local and global data which allows more efficient running of a memory.

According to another aspect of the invention, there is provided a microprocessor system, the microprocessor system comprising two or more central processing units (CPU's), each CPU having a cache memory, and the system further comprising a system memory, the system memory being divided into pages and the pages into blocks, and the pages being flagged with one of three statuses, namely "cacheable", "non-cacheable" and "free" wherein the system is responsive to a request for allocation of memory space of cacheable or non-cacheable type, by allocating a block of memory from a page of appropriate status or, if such a block is unavailable, a block from a page of "free" status, the system thereafter changing the status of said page from "free" to "cacheable" or "non-cacheable" as the case may be, and is responsive to a request that an allocated block of memory is to be discarded.

The system allocates memory space in a dynamic manner, and by turning firstly to the pages having appropriate status for an allocation request, and only turning to "free" status pages if such a page is unavailable, the system ensures that memory does not become overly fragmented in its allocation.

The system may further be responsive to a request to discard a block in that if said block is the only allocated block on the relevant page of memory then the system changes the status of said page to "free".

The cache memory of each processor may be divided into lines. Preferably, the size of the blocks of the system memory is a whole multiple of the size of the lines. In that way, the chance of data being inadvertently overwritten, when moved between the cache memory and the system memory, is minimised.

BRIEF DESCRIPTION OF DRAWINGS

Further aspects and advantages of the invention will be apparent from the following description of a specific embodiment of the invention with reference to the accompanying drawings, in which.

DESCRIPTION OF SPECIFIC EMBODIMENT

Figure 1:
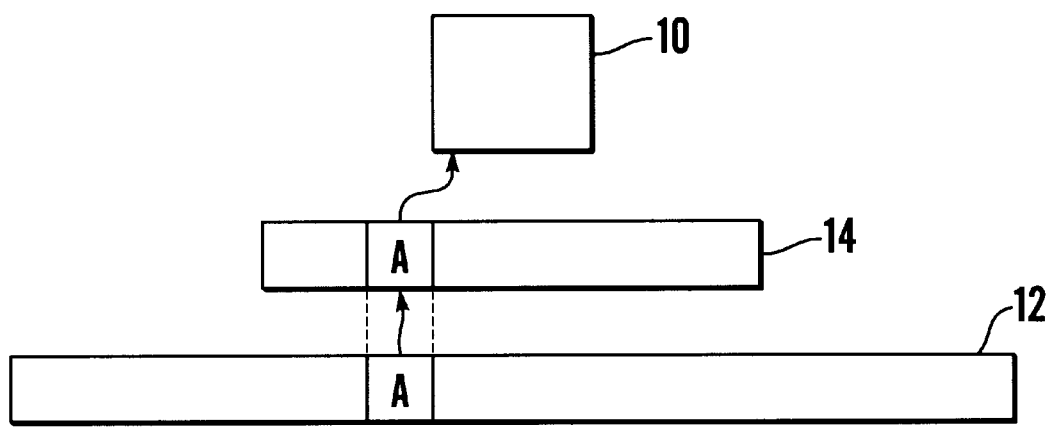
FIG. 1 is a schematic diagram of a first system described in the introduction and not forming part of the invention.
Figure 2:
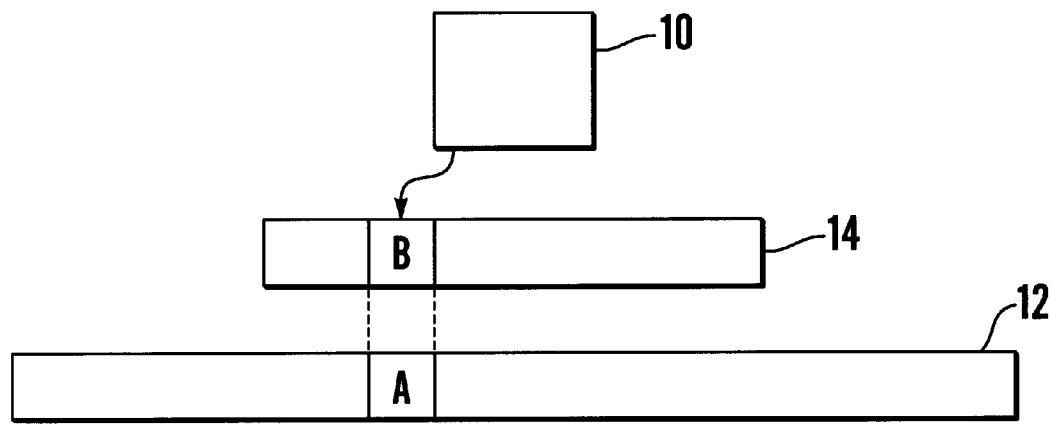
FIG. 2 is a schematic diagram of a second system described in the introduction and not forming part of the invention.
Figure 3:
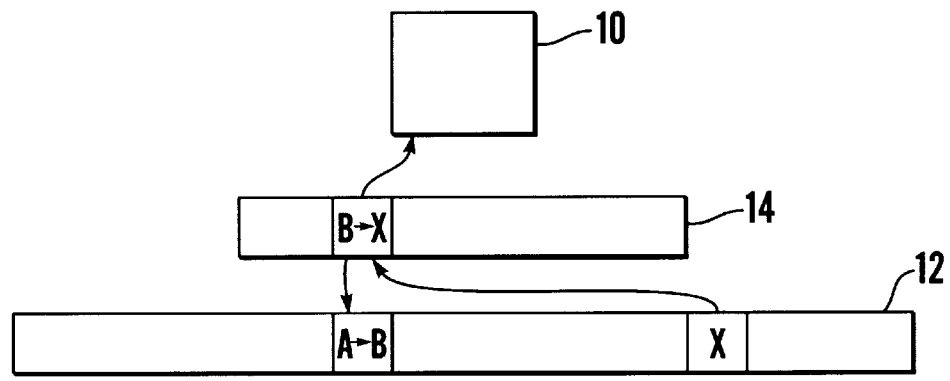
FIG. 3 is a schematic diagram of a third system described in the introduction and not forming part of the invention.
Figure 4:
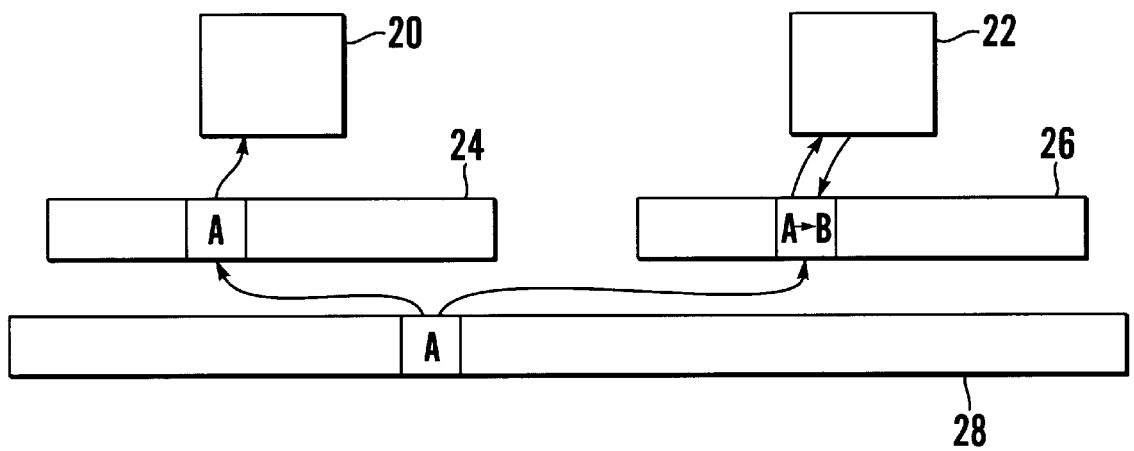
FIG. 4 is a schematic diagram of a fourth system described in the introduction and not forming part of the invention.
Figure 5:
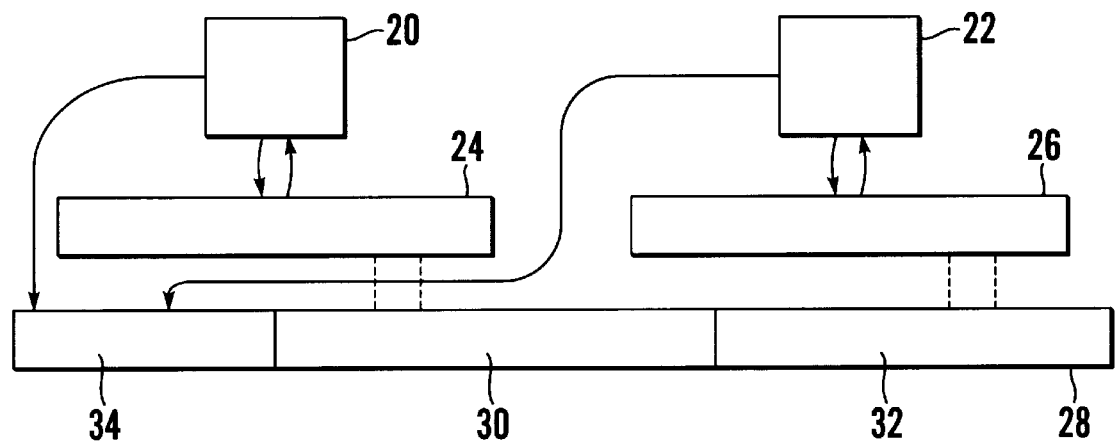
FIG. 5 is a schematic diagram of a fifth system described in the introduction and not forming part of the invention.
Figure 6:
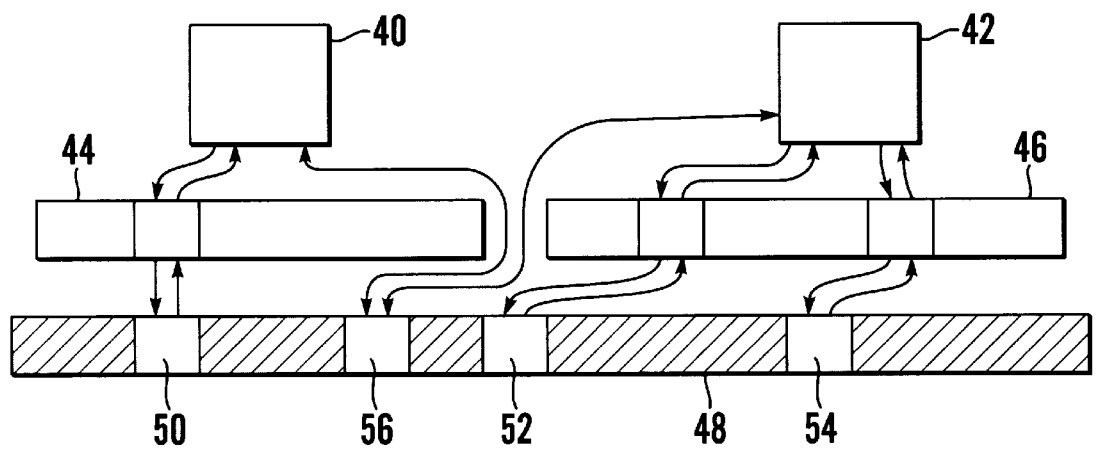
FIG. 6 is a schematic diagram of a sixth system described in the introduction, and on which a specific embodiment of the invention is implemented as described below.

In the example illustrated in FIG. 6, blocks 50, 52, 54, 56 of the system memory 48 are shown to be allocated. The shaded portions of the system memory 48 are not allocated.

One block 50 is allocated from one or more cacheable status pages to be accessed only by the first CPU 40 via its cache memory 44. Two other blocks 52, 54 are allocated from cacheable status pages to be accessed only by the second CPU 42 via its cache memory 46. A fourth block 56 is allocated from a non-cacheable status page and is accessible by either CPU 40, 42, and bypassing the cache memories 44, 46.

Once access to the allocated blocks is no longer required, the blocks are returned to an unallocated state. If the whole of a page of memory is unallocated, then the page is returned to a free status. A page flagged in the page table as being free must have no allocated blocks.

Blocks within a page flagged as "cacheable" can either be in use as cacheable memory or unallocated. Blocks within a page flagged as "non-cacheable" can either be in use as non-cacheable memory or unallocated.

The TLB within a cache memory 44, 46 is updated whenever an unallocated block of the system memory 48 is allocated as a cacheable block of memory. If necessary, the page table in system memory 48 is also updated, although that step is only necessary if the page in which the newly allocated block resides was previously flagged in the page table as being free. Hence, the TLB contains a copy of the status information in the page table for that page.

If a non-cacheable block of system memory 48 is allocated, then no change is required to the contents of any TLB. Non-cacheable memory is accessed directly, and not via a cache memory 44, 46, so the allocation of the blocks within a non-cacheable page is not relevant to a cache memory.

If the block had been allocated from a page previously flagged as being free, then the page table on the system memory 48 will need to be updated to reflect the change in the status of the page to "non-cacheable".

When a CPU 40, 42 has completed use of a block of system memory 48 allocated to it as cacheable memory (i.e. for local use only), it invalidates that memory block entry in its TLB and invalidates the data cached within its cache 44, 46. The memory management unit and associated software then releases that memory block in system memory 48; the block is then rendered unallocated.

If that block had been the only allocated block within the page, then the status of the page is changed from "cacheable" to "free" and the page table in system memory 48 is updated to reflect that change. Otherwise, the flag in the page table remains as "cacheable".

Generally, it is faster to throw away (invalidate) data stored in cache memory 44, 46, rather than writing it back to system memory 48. In accordance with the invention, write-back is not necessary once the cache memory 44, 46 has been freed. Hence, the system speed performance is enhanced without loss of any data still in use.

When a CPU 40, 42 has completed use of a block of system memory 48 allocated to it as non-cacheable memory (i.e. for global use), the memory management unit and associated software releases that memory block in system memory 48. The block is then rendered unallocated.

If that block had been the only allocated block within the page, then the status of the page is changed from "non-cacheable" to "free" and the page table in system memory 48 is updated to reflect that change. Otherwise, the flag in the page table remains as "cacheable".

Occasionally, data must be written back from the cache memory 44, 46 to the system memory 48. That could be necessary if the cache is insufficiently large to deal with all of the local variables used in a routine. In that case, a portion of the variables could be written back to the system memory 48 so that another portion of the local variables could be handled in the higher speed cache memory.

The cache memories 44, 46 are normally divided into "lines" rather than blocks. That arrangement is part of the architecture of the microprocessor. To prevent a loss of data during write-back or during invalidation of cacheable memory space, the size of a block within the system memory 48 should be a multiple of the size of a line of cache memory 44, 46. That will ensure that adjacent blocks of system memory cannot be inadvertently over-written following a cache write-back or invalidation.

For example, if the line size is 32 bytes, the blocks within a page of the system memory 48 should be 32 or 64 bytes long.

Cache consistency is ensured whilst maintaining the flexible and dynamic allocation of system memory 48 to a plurality of CPU's. Although a system involving two CPU's 40, 42 is illustrated in the above example, the invention applies equally to systems having three or more CPU's.

In accordance with the system described above, a page of system memory does not change status directly from "cacheable" to "non-cacheable". If a page has one block allocated on it to a particular CPU, when the CPU releases that block, the page is rendered completely unallocated, and the status of the page on the page table is updated to "free". Accordingly, the invention provides a safeguard against glitches occurring through a false transition of a page from "cacheable" to "non-cacheable" memory.

What is claimed is:

1. A microprocessor system comprising:

at least two processors, each processor having a cache memory; and a system memory which is divided into pages, each of which initially has a "free" status and is sub-divided into unallocated blocks;

wherein the system is responsive to a first request for allocation of memory space of cacheable or non-cacheable type, by:

dynamically allocating a block of memory from a page of "free" status, the system thereafter changing the status of said page from "free" to "cacheable" or "non-cacheable" as the case may be; and is responsive to a further request for allocation of memory space of cacheable or non-cacheable type, by:

dynamically allocating a block of memory from a page of appropriate status; or if such a block is unavailable, dynamically allocating a block from a page having "free" status, the system thereafter changing the status of said page from "free" to "cacheable" or "non-cacheable" as the case may be.

2. A system according to claim 1 wherein the system is responsive to a request that an allocated block of memory is to be discarded.

3. A system according to claim 1, the system further being responsive to a request to discard a block in that if said block is the only allocated block on the relevant page of memory then the system changes the status of said page to "free".

4. A system according to claim 1 wherein the cache memory of each processor is divided into lines.

5. A system according to claim 1 wherein the size of the blocks of the system memory is a whole multiple of the size of the lines.

6. A system according to claim 2 wherein the cache memory of each processor is divided into lines.

7. a system according to claim 6 wherein the size of the blocks of the system memory is a whole multiple of the size of the lines.

8. A method of managing memory in a system wherein the system comprises:

at least two processors and a system memory, each processor having a cache memory; and wherein the system memory is divided into pages each of which initially has a "free" status and is sub-divided into unallocated blocks;

wherein the method comprises:

if a first block of memory is required for storage of data local to a specific processor then:

(a) selecting a page having "free" status and changing the status of said page to "cacheable"; and (b) dynamically allocating a block of said page to be accessed by said processor;

if a further block of memory is required for storage of data local to a specific processor then:

(a) if a page having "cacheable" status has an unallocated block, dynamically allocating said block of said page to be accessed by said processor; and (b) if no block of a page having "cacheable" status is available then selecting a page having "free" status, changing the status of said page to "cacheable" and dynamically allocating a block of said page to be accessed by said processor;

if a block of memory is required for storage of data to be accessed by more than one processor then:
  (a) selecting a page having "free" status and changing the status of said page to "non-cacheable"; and
  (b) dynamically allocating a block of said page to be accessed by any processor;

if a further block of memory is required for storage of data to be accessed by more than one processor then:
  (a) if a page having "non-cacheable" status has an unallocated block, dynamically allocating said block of said page to be accessed by any processor; and
  (b) if no block of a page having "non-cacheable" status is available then selecting a page having "free" status, changing the status of said page to "non-cacheable" and dynamically allocating a block of said page to be accessed by any processor;

retaining a page record as to the status of each page; and retaining an allocation record as to which blocks of a page have been allocated.

9. A method according to claim 8 wherein if an allocated block is no longer required, the allocation record is amended to discard the allocation of the block.

10. A method according to claim 8 wherein if no blocks on a page of memory having "cacheable" or "non-cacheable" status are allocated, the status of said page is changed to "free".

11. A method according to claim 9 wherein if no blocks on a page of memory having "cacheable" or "non-cacheable" status are allocated, the status of said page is changed to "free".

12. A method according to claim 8 wherein the step of discarding the allocation of a block allocated from a page having "cacheable" status comprises the step of discarding the data of the block.

* * * * *